B. M. DAVIS.
TELEPHONE SYSTEM.
APPLICATION FILED MAR. 5, 1908.

1,146,786.

Patented July 20, 1915.
6 SHEETS—SHEET 3.

Witnesses
A. Anderson.
A. B. Sperry.

Inventor:
Bethuel M. Davis,
By Bulkley, Durand & Drury,
Attorneys.

B. M. DAVIS.
TELEPHONE SYSTEM.
APPLICATION FILED MAR. 5, 1908.

1,146,786.

Patented July 20, 1915.
6 SHEETS—SHEET 4.

Witnesses
A. Andersen
A. B. Sperry

Inventor:
Bethuel M. Davis,
By Bulkley, Durand & Drury,
Attorneys.

Fig. 11.

UNITED STATES PATENT OFFICE.

BETHUEL M. DAVIS, OF CHICAGO, ILLINOIS, ASSIGNOR, BY MESNE ASSIGNMENTS, TO AUTOMATIC ELECTRIC COMPANY, OF CHICAGO, ILLINOIS, A CORPORATION OF ILLINOIS.

TELEPHONE SYSTEM.

1,146,786. Specification of Letters Patent. Patented July 20, 1915.

Application filed March 5, 1908. Serial No. 419,302.

*To all whom it may concern:*

Be it known that I, BETHUEL M. DAVIS, a citizen of the United States of America, and resident of Chicago, Cook county, Illinois, have invented a certain new and useful Improvement in Telephone Systems, of which the following is a specification.

My invention relates to automatic telephone exchange systems of that particular type in which the subscribers' metallic line circuits are free from operating grounds at the substations, and in which the automatic switches at the exchange are, therefore, controlled over circuits including the two sides of the subscribers' lines in series, through the medium of a make-and-break device or impulse-transmitting device included directly in the line at each substation.

My invention also relates more especially to two-wire automatic telephone exchange systems of this character in which the release or disconnection between subscribers' lines is effected through the medium of certain slow-acting release relays—that is to say, relays which are retained in an energized condition during conversation between the two subscribers, and which are made slow-acting to prevent a premature release during the transmission of the call, the sluggish or reluctant manner in which these relays deënergize being sufficient to prevent them from being deënergized by the brief or momentary breaking of the circuit during the transmission of the call, whereby they only deënergize to effect the release when the subscriber hangs up his telephone and thereby opens the line circuit for a much longer period of time, of course, than is the case during the transmission of the call.

In systems of the foregoing general character it was found that the calling subscriber would occasionally stop or restrain the make-and-break device during the transmission of the call, thus holding the line circuit open for a period of time sufficient to deënergize the said slow-acting release relays, thus bringing about a premature release of the switch or switches, either purposely or inadvertently, and necessitating a repetition of the entire calling operation. Primarily, therefore, my invention is addressed to the problem of preventing a premature release of the switches in a two-wire automatic telephone exchange system in which the release is effected through the medium of slow-acting release relays that remain energized during conversation between the two subscribers.

My invention also contemplates a subscriber's calling mechanism in which the rotatable dial or member which the subscriber manually operates to produce the calling impulses is provided with means for precluding a forcible backward rotation thereof, whereby the subscriber cannot accelerate the speed with which the impulses are delivered over the line to the exchange, and in which the make-and-break device is so constructed and connected with the said dial that after it once starts to rotate to normal position it cannot then be stopped or restrained in its action, but will continue in its operation until the impulses have all been properly transmitted over the line, whereby the subscriber is not only precluded from forcing or accelerating the transmission of said impulses, but is also prevented or precluded from stopping the transmission of the impulses after the make-and-break device has once started to operate under the propelling action of the spring by which it is returned to the normal position from which it was moved by the forward rotation of the calling dial.

In a system of this kind it is important that the subscriber be precluded from forcing or accelerating the speed with which the calling impulses are transmitted over the line, and it is equally important, where slow-acting release relays are employed in the manner explained, that the calling subscriber be precluded from interrupting or restraining the operation of the make-and-break device at a time when the line circuit would be held open for such a period of time that the release relays would be deënergized, and a premature release thereby precipitated. With the combination of the non-forcible dial and the non-interruptible or non-restrainable make-and-break device, as previously referred to, I am enabled to overcome both of the said difficulties.

To the foregoing and other useful ends, therefore, my invention consists in matters hereinafter set forth and claimed.

In the accompanying drawings, Figs. 11 and 12 taken together illustrate an established connection between the subscribers A and A′, the subscriber A being the calling subscriber.

Figure 1:
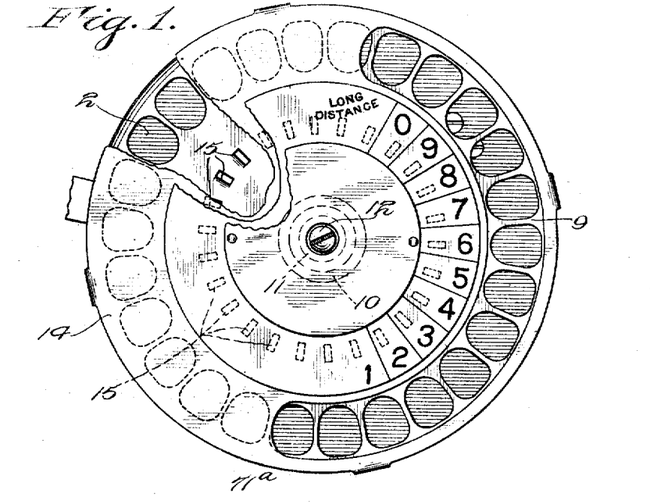
Figure 1 is a front elevation of a subscriber's calling device, showing the apertured dial or rotatable portion equipped with a metal cover containing the subscriber's calling figures and number-plate.
Figure 6:
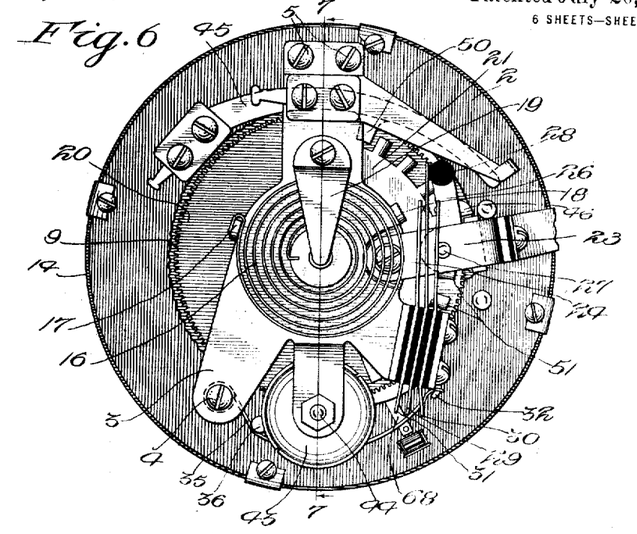
Fig. 6 is a rear elevation of the calling device, showing the various features, such as governor, impulse wheel, a portion of the switch-hook and controlling spring, ground spring, impulse springs, etc.
Figure 8:
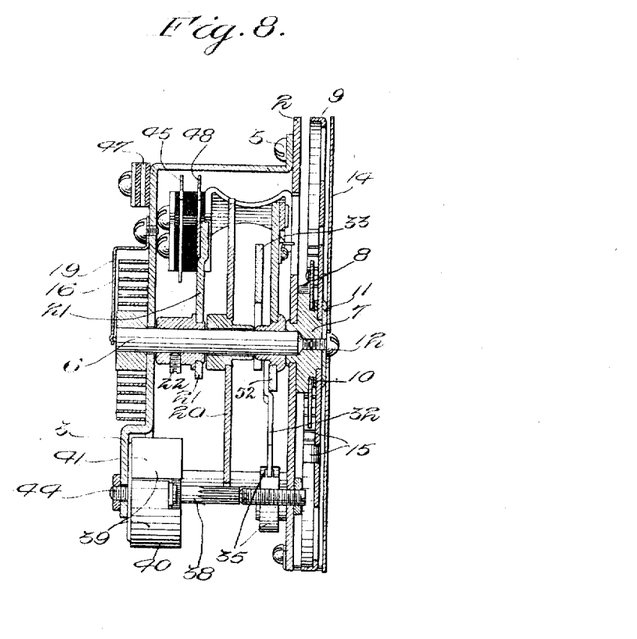
Fig. 8 represents a partial cross-section of Fig. 6 on line 7—7.

As thus illustrated, and referring to Fig. 6, it will be seen that the framework comprises a front plate 2 and a back plate 3, the two plates being rigidly connected together by the rod 4 and two screws 5. Upon this framework all of the operative parts of the calling and switch-hook mechanisms are mounted in a suitable manner. A shaft 6 (Fig. 8) extends centrally through the said plates 2 and 3 and is arranged to rotate freely upon bearings. The front bearing of this shaft consists of a hub 7, grooved to different diameters, and adapted to provide bearings for the locking disk 8 (Fig. 4) and the dial 9 (Fig. 1). The disk is retained in position by the metal washer 10 (Fig. 4) while the dial 9 is held in position between the said washer 10 and the metal washer 11 supported by the screw 12, as shown in Fig. 8. Both the locking disk 8 and the dial 9 rotate freely upon their bearings, the disk being held normally in position by the spring 13 (Fig. 3), while the dial is symmetrical and has no normal position relative to the other mechanisms. One end of the spring 13 is fastened to the disk 8, while the other end is attached to the front plate 2. It will be understood, of course, that the said dial and disk may be secured in any other suitable and approved manner. Along the periphery of the dial 9 there is, as will be observed, a series of openings, twenty-six in number, as shown in Fig. 1. Thirteen of these openings and a portion of one other are exposed through the circumferential opening on the cover-plate 14, which circumferential opening determines the limit of rotation of the dial for any particular digit. The remainder of these openings or finger-holes, with the exception of two, being represented under the cover-plate, are indicated by dotted lines. On said dial plate, within the outer series of openings and on the under side of the dial, will be found a series of projections corresponding in number to the openings along the periphery, and being under the cover-plate are represented by the dotted rectangles 15. These projections may be made by punching through the metal dial plate 9.

Figure 2:
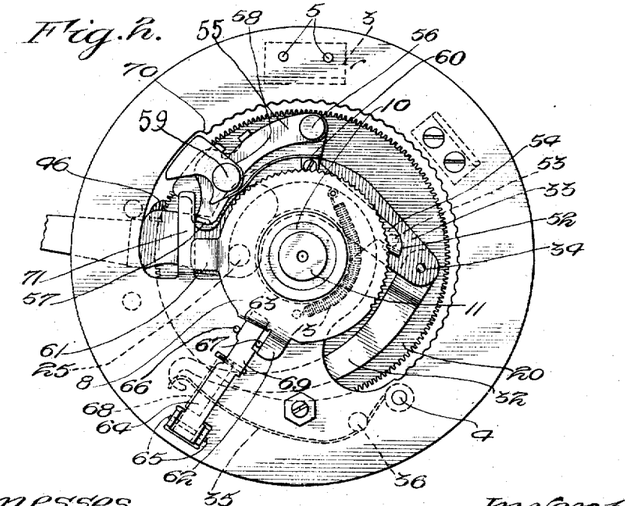
Fig. 2 is a front elevation of the same with the metal cover and movable dial removed, showing the mechanism underneath which controls and is controlled by the dial.
Figure 7:
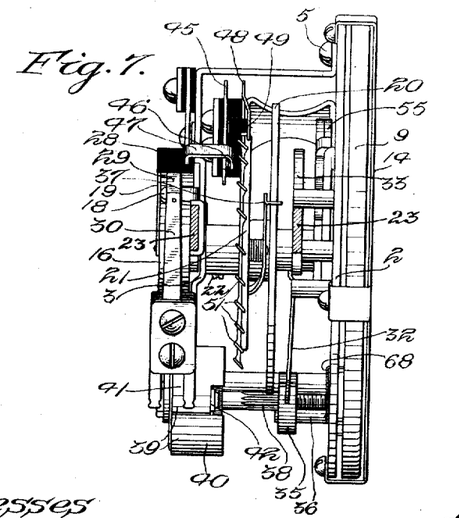
Fig. 7 is a side elevation of the mechanism shown in Fig. 6.

Directly back of the plate 3, as shown in Fig. 6, there is a clock-spring 16. This spring is secured at one end to a projection on the back plate at the point 17, and is confined within definite limits and held in position by the projecting arm 18 and the spring bracket 19. The inner end of the spring 16 is fastened to the shaft 6 in such a manner that its tension, when wound, tends to rotate the shaft in a counter-clockwise direction, when viewed from the front. Mounted upon the shaft 6 there is also a gear wheel 20 arranged to rotate freely upon the shaft except when engaged by a ratchet arm, as will hereinafter appear. In addition the toothed disk or impulse wheel 21 (Fig. 7) is fastened to the said shaft by means of a clamp 22. A receiver-hook 23 is pivoted on the back plate 3 at the point 24, and on the front plate 2 at the point 25, as represented by the dotted circle in Fig. 2. Said receiver-hook is arranged to have a limited up-and-down movement when the receiver is removed and replaced. A release cam 26 (Fig. 6) is rigidly fastened to said hook at the point 27. At its extremity this cam 26 is provided with an insulating bushing 28. When the telephone receiver rests upon the hook, the latter being down the arm of the cam 26 permits the spring 29 to be in contact with the spring 30; but upon removing the receiver this cam operating upon the spring 29 by means of the bushing 28 separates it from the spring 30 and places it in contact with the spring 31. The arm 32 (Fig. 2) is pivoted to the backward extension 33 of the receiver-hook at the point 34, its extremity being engaged by the spring 35, which latter is rigidly secured to the portion or rod 4 after passing over a projecting rod 36 of the front plate 2. The tension of the spring tends to always keep the receiver-hook in an elevated position, which is accomplished when the receiver is removed from the hook. Secured to the impulse wheel 21 of the calling device is a dog 37 which is held normally in contact with the teeth of the gear wheel 20. As the dial is rotated in a forward direction this dog 37 passes freely over the teeth of said gear wheel. However, when the impulse wheel, relieved from the control of the dial, begins to rotate back to its normal position under tension of the spring 16, then this dog engages the gear wheel, causing it to revolve in unison with the impulse wheel. As will be observed, the said gear wheel is caused to revolve or rotate when the hook is moved downward, or when the impulse wheel is rotated under the control of the clock-spring. The conditions that cause the gear wheel to revolve when the switch hook is moved downward will be easily understood by referring to Figs. 2, 6 and 7. The arm 52 (shown in Fig. 2 and hereinafter referred to) is rigidly connected to the shaft. If it were not for this arm 52, which strikes the pin 53 on the rear of the switch hook, the main spring 16 shown in Fig. 6 would unwind itself, and if this spring 16 were strong enough it would prevent the switch hook from rising. The arrangement is such, however, that the switch hook spring 35, shown in dotted lines in the lower part of Fig. 2, is sufficiently strong to overcome the opposing force of the main spring 16. It is obvious, therefore, that when the switch hook has been raised the shaft is rotated to a certain extent in a clockwise direction, viewing it as shown in Fig. 2. When the switch hook is depressed the shaft naturally resumes its original position, because the arm 52 follows up the stop 53. Now, since the impulse wheel 21 (Fig. 7) is rigid with the shaft it will turn with the shaft, and since it is provided with the dog 37 (Fig. 7) the gear wheel will be rotated. As a matter of fact, if the switch hook is jerked down quickly the arm 52 lags behind the stop 53. The teeth of the gear wheel engage with the teeth of a pinion 38 (Fig. 7). This pinion is a part of the so-called governor or governing device 39—that is, the device which controls the speed of the impulse wheel when it rotates backward after being released from the control of the dial, and which controls the speed of the switch-hook when the latter is returned to its normal position. Upon the end of the pinion are pivoted two parts 40 and 41 which, taken together, form a cylinder, the two parts being suitably pivoted, as part 41 at the point 42. These parts are normally held together by means of two springs (not shown), and are adapted to fit loosely upon the cup-shaped ring 43 (Fig. 6), the latter being rigidly fastened to the framework of the calling device at the point 44. As the pinion 38 revolves rapidly when actuated by the gear wheel 20, the ends of the parts 40 and 41 farthest away from their respective pivotal points move away from their axes of rotation. This causes a bunching of these parts against the stationary cup-shaped ring 43, producing sufficient friction to maintain constant the speed of the gear wheel and, consequently, that of the impulse wheel.

Figure 3:
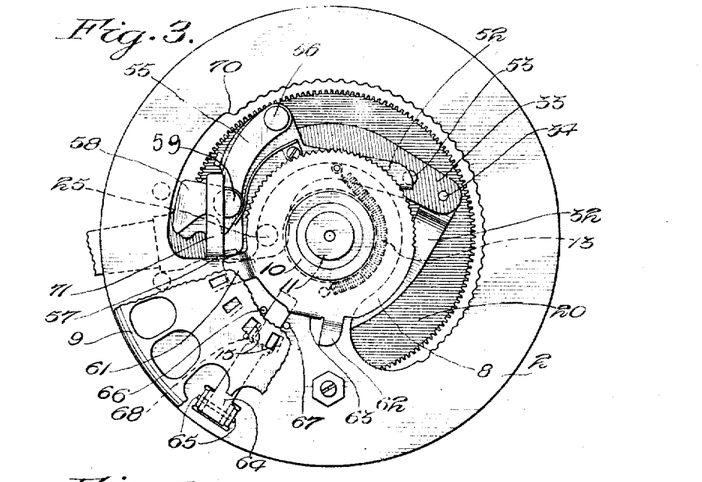
Fig. 3 is a similar elevation but with a portion of the dial represented in position to engage the controlling lever of the impulse wheel, and showing the lever which prevents backward rotation of the dial.
Figure 4:
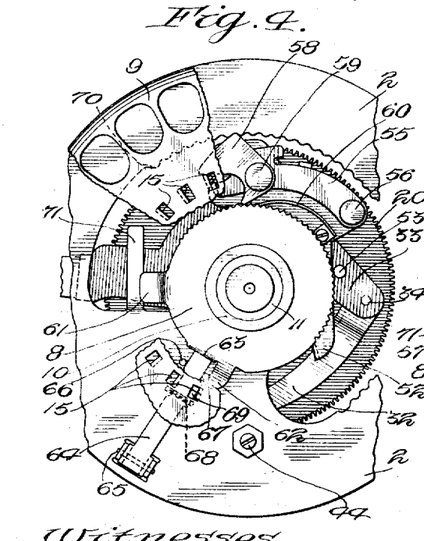
Fig. 4 shows the relative position of the mechanism represented in Fig. 3, while the dial is being rotated.
Figure 5:
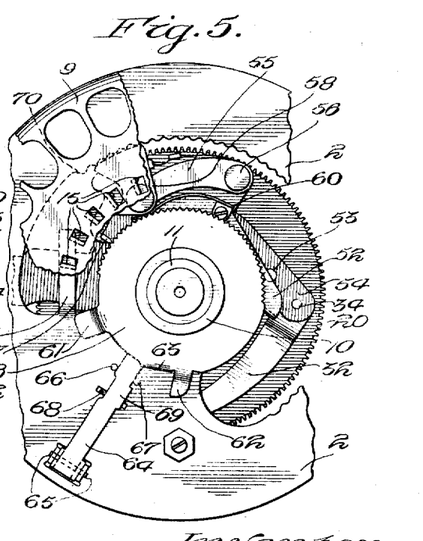
Fig. 5 shows the relative positions of the parts while the mechanism as a whole returns to its original position.
Figure 9:
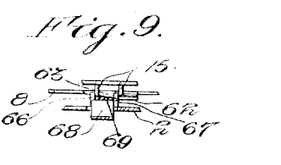
Fig. 9 is a section showing the device which prevents backward rotation of the dial.
Figure 10:
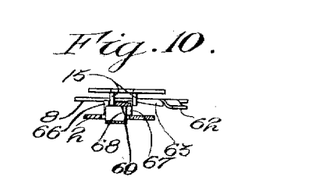
Fig. 10 represents a section of the same mechanism shown in Fig. 9, showing how the dial is locked after the impulse wheel has been released.

Mounted upon the frame of the calling device, and likewise rigidly fastened to but insulated therefrom, is an impulse spring 45 in contact at the point 46 with a rigid arm 47. This arm is also fastened securely to the frame of the calling device, but insulated therefrom. Parallel with the spring 45 is another spring 48 (Fig. 7) which contains a bushing 49 acting upon the spring 45 to break contact between it and the arm 47 when the impulse wheel has been operated and rotates back. On this spring 48 is a projection 50 (Fig. 6) so shaped that each impulse tooth 51 of the impulse wheel 21 presses the spring 48 away from the spring 45 as the wheel 21 is rotated forward. When the impulse wheel returns, however, the teeth successively engage the projection 50 in a well known manner, so as to press the bushing 49 against the spring 45 and cause said spring to break contact with the arm 47 once for each impulse tooth which passes the projection 50. Fastened to the shaft directly back of the front face plate 2 is an arm 52 which engages a pin 53 on the back extension 54 of the receiver-hook. This arm rotates in unison with the impulse wheel and prevents it from rotating back beyond a certain point, owing to its bearing on said pin 53. Upon the arm 52 is a lever 55 pivoted at 56 and having at the other end a projection 57 adapted to engage the notched disk 8 or some one of the projection 15 of the dial at the appropriate time. Upon the lever 55 is another cam 58 pivoted at 59 and acted upon by a spring 60. This spring normally keeps the cam 58 in such a position that its length is at right angles to the lever 55, as shown in Fig. 3. The locking disk 8 has half its circumference notched to form a regular series of teeth and is equipped with two projections 61 and 62 extending from the periphery of the other half. Between these two projections a portion of the disk is bent over and downward and given an oblique edge 63 (Fig. 10), this edge acting upon the lever 64, as shown in Figs. 4 and 5. Said lever 64 is pivoted at the point 65 and is guided in its movements by two pins 66 and 67 as it is depressed by the edge 63 of the disk 8, or raised by the action of the spring 68, shown in Fig. 6. When the receiver is on the switch-hook, which is in its normal position, the projection 57 engages the projection 61 and holds the disk 8 in the position shown in Fig. 3. In this position the lever 64 is not depressed by the edge 63 of the locking disk 8. Consequently the spring 68 acts to raise the lever 64 sufficiently so that the portion 69 of the lever is engaged by the projections on the under side of the dial, as shown in Fig. 3, and more clearly in Fig. 10. In this manner the forward or backward rotation of the dial is prevented as long as the switch-hook is down. When the switch-hook is raised the spring 13 rotates the disk 8 until the projection 62 comes in contact with the pin 67 and the edge 63 has again depressed the lever arm 64. The portion 69 of said arm does not have its surface parallel with the dial, but at an angle such that the portion which opposes the forward movement of the dial when the arm is raised allows the projection 15 of the dial (Fig. 10) to just pass over its edge when this arm is depressed. (See Fig. 9.) The opposite edge, however, which opposes the backward movement of the dial, is never depressed so far that it escapes the projections of the dial when an attempt is made to rotate said dial backward. When the dial is drawn down the projection 15 on the said dial nearest the projection 57 engages said projection 57, and the portion 52 (Fig. 5) with all its parts 55 and 58 is rotated along with the impulse wheel in consequence. As soon as the cam 58 strikes the waved edge of the front plate 2 at the point 70 it is deflected, as shown in Fig. 4, thus allowing the projection 57, as shown in Fig. 3, to still clear the teeth of the disk 8 and remain in engagement with the projection 15. The stop which limits the downward pull of the dial for any particular digit is the cover-plate 14 at the point 71ª. This point is so situated that the last projection on the back of the dial plate which engages the lever 64 for any particular digit is drawn a little beyond the lever 64. This allows sufficient backward movement of the dial to permit the cam 58 to assume its upright position. The consequent depression of the arm 55 causes the finger 57 to engage the disk 8, at the same time withdrawing the said finger from engagement with the projection 15 of the dial, by means of which the rotation of the mechanism was accomplished. This, then, causes a release of the parts from the dial and allows them to return to their normal positions under the control of the clock-spring. In consequence of the projection 57 engaging said disk 8 as the impulse wheel rotates back, said disk is carried with it. The lug 61 is raised slightly above the plane of the disk 8 in order that it may pass over the top of the pins 66 and 67. The moment this occurs the lever 64 rises and makes it impossible to rotate the dial again until the impulse wheel has returned to normal and the disk is again released. The release of said disk is effected by the cam 58 reaching the off-set in the cover-plate at the point 70, at which time the spring 60 raises the arm 55, freeing the projection 57 from the disk, which then returns to its original position under the influence of the spring 13. When the receiver is taken from the hook or replaced, the movement of the projection 57 is guided by a projection 71 extending from the front plate. The cover-plate 14 may be fastened to the front plate 2 in any suitable manner, and may have mounted thereon in any suitable manner the series of numbers and directions, in accordance with which the subscriber may select the proper finger holes in the dial to obtain his connections. The further operation of the calling device may best be shown by the process of tracing a call from one subscriber to another through the medium of certain automatic mechanisms.

As shown, the line of substation A (Fig. 11) terminates in a line switch C. The master switch that controls the selective operations of this line switch, as well as the other line switches of the same group, is shown at D. The line switch C is a trunking switch provided with suitable bank jacks assembled to form a so-called line switch bank (not shown). Each of these bank jacks E is the terminal of a trunk-line terminating in a selector or connector switch—as here shown, in the first-selector switch F. It is to be understood, of course, that these bank jacks E are multipled with the corresponding jacks of all the other line switches of the same group. It will also be understood that when one line switch is occupying one of these jacks no other line switch can come in on the same trunk-line. The first-selector F is also a trunking switch and is provided with sets of trunk terminals each set of which may terminate in a second-selector switch, or, as in this instance, the connector switch H. As in the case of the line switch banks, corresponding terminals throughout the first-selector bank sets are multipled together. The line switch C' allotted to substation A' is identical in construction with the line switch C.

Figure 11:
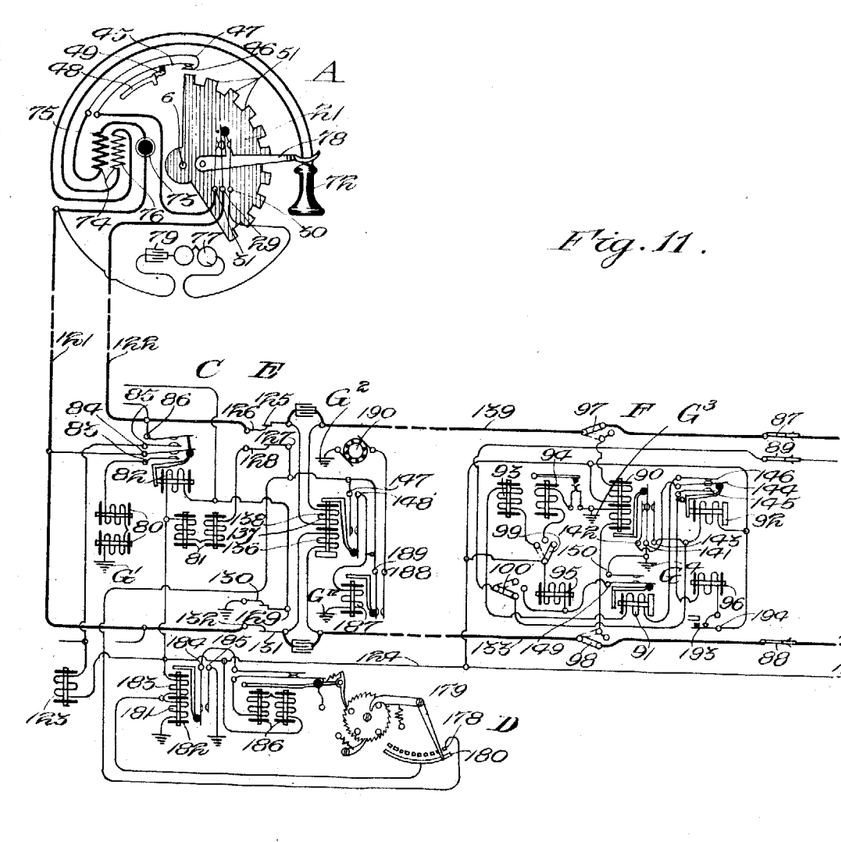
Fig. 11 illustrates a subscriber's station A and a portion of the exchange apparatus.

The substation A illustrates the calling device previously described in its capacity of calling a subscriber automatically. As shown, this substation comprises the usual receiver 72, transmitter 73, induction coil 74 with the primary winding 75 and secondary winding 76, ringer 77, switch-hook 78, and the aforesaid described impulse wheel 21. It is understood that associated with this station are all the other parts of the calling device described in the preceding. As this is a common battery system the transmitter 73 and the primary winding 75 are in series with the line conductors 121 and 122 when the subscribers are talking. The receiver 72 is in a closed local circuit in series with the secondary winding 76. When the switch-hook is down the springs 29 and 30 are maintained in contact for the purpose of bridging the ringer 77 in series with the condenser 79 across the line. When the switch-hook rises on removing the receiver the springs 29 and 31 are brought into contact, thereby closing the talking circuit. The line switch C, which is allotted exclusively to a subscriber, comprises the so-called trip magnet 80, the release magnet 81, and the bridge-cut-off relay 82 provided with the springs 83, 84, 85 and 86.

The first-selector F is a modified form of the selector switch disclosed in United States Letters Patent No. 815,321, granted March 13, 1906, to Keith, Erickson & Erickson. It is provided with a switch shaft (not shown) carrying the line and private wipers 87, 88 and 89, a double-wound coil 90, a slow-acting private magnet relay 91, and a slow-acting releasing relay 92. The vertical magnet 93, rotary magnet 94, release magnet 96, and the private magnet 95 are well known. The said private magnet controls the side switch wipers 97, 98, 99 and 100.

Figure 12:
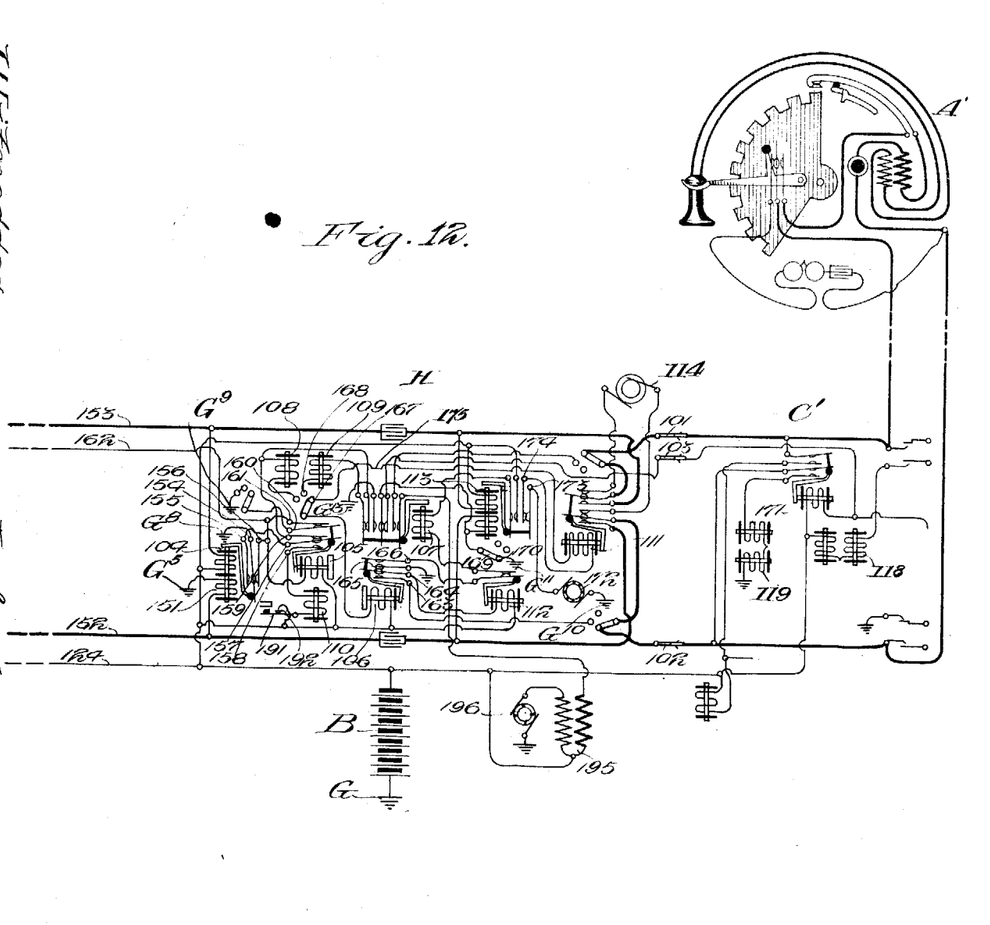
Fig. 12 shows another subscriber's station A′ and a still further portion of the exchange apparatus.

The connector switch H is a modified form of the connector switch disclosed in United States Letters Patent No. 815,176, granted March 13, 1906, to Keith, Erickson & Erickson. It is also provided with the usual switch shaft (not shown) carrying the line and private wipers 101, 102 and 103, a double-wound coil 104, and the slow-acting release and private magnet relays 105 and 106, respectively. It is further provided with an auxiliary relay 107 which operates to lock the connector side switch in second position if a busy line is called. The vertical magnet 108, rotary magnet 109, release magnet 110, ringer relay 111, private magnet 112, and the back-bridge relay 113 are well known. The exchange contains a ringer generator 114, an interrupter 172 for the ringer relay circuit, and an interrupter 196 for the busy transformer 195.

The line switch C', of the same construction as the line switch C, contains the release magnet 118, trip magnet 119 and the cut-off relay 171.

Assuming this to be a one-thousand subscriber system, the substation A' will be designated #220, and in order to call said substation the subscriber at substation A must operate his dial three times in accordance with the digits 2, 2 and 0. As soon as the subscriber removes his receiver 72 the switch-hook rises and closes the springs 29 and 31. A circuit is thereby closed which extends from ground G' through the trip magnet 80, through the cut-off springs 83 and 84, which are normally closed, to the line conductor 121, through the transmitter 73, interrupter springs 47 and 45, springs 31 and 29, line conductor 122, cut-off springs 86 and 85, relay 123 to the battery lead 124, thence through battery B to ground G.

Through the action of the trip magnet upon a plunger (not shown) the bank contact springs 125 and 126, 127 and 128, 129 and 130, and 131 and 132 are closed, as shown at E. The closing of contact between springs 129 and 130 completes an energizing circuit to the bridge-cut-off relay 82 which acts to separate the springs of said relay and thereby break the energizing circuit through the trip magnet 80 and the common relay 123. The closure of contact between the bank springs 125 and 126 and 131 and 132 extends the subscriber's line conductors 121 and 122 to the trunk-line conductors 133 and 139, respectively, leading to the selector F. This results in an energizing circuit being established from ground $G^3$ through the lower winding of the relay 90, side switch wiper 98, trunk conductor 133, winding 136 of the trunk relay 137, through the bank springs 131 and 132, line conductor 121, through substation A to the line conductor 122, through the bank springs 126 and 125, winding 138 of the relay 137 to the trunk conductor 139, through the side switch wiper 97, upper winding of the relay 90 to the battery lead 124, thence through battery B to ground G. The line relay 90 is thus energized, transferring the spring 141 from contact with the spring 142 and into contact with the spring 143, and closes a circuit energizing the slow-acting relay 92, which in turn shifts the spring 144 from contact with the spring 145 and into contact with the spring 146. The circuit for the slow-acting relay 92 extends from ground $G^4$ through the springs 141 and 143, relay 92 to the battery lead 124, thence through battery B to ground G. When the relay 92 energizes, as described, the line relay spring 142 is placed in connection with the slow-acting private magnet relay 91, and through said relay with the vertical magnet 93, whereby ground impulses may be sent from said spring 142 through the said magnets 91 and 93 while the relay 92 is energized. The trunk relay 137 being included in the same circuit as the line relay 90, energizes at the same time and separates springs 147 and 148. So far all this has been accomplished by the subscriber in the act of removing his receiver from the hook. He now proceeds to call by operating the dial for the first digit 2. When the dial is drawn down the impulse wheel 21 is rotated so that two of the impulse teeth 51 are carried beyond the lug 50 on the spring 48. When the dial is released the impulse teeth act upon the lug 50 to twice separate the spring 45 from contact with the spring 47. Each time that the said springs are separated the energizing circuit for the relays 137 and 90 is interrupted, but relay 137 being slow-acting is not given time to deënergize between impulses, the impulse wheel operating at a rate to produce that result. Each time that the circuit is interrupted at the springs 45 and 47 the line relay 90 of the selector F falls back and permits the spring 141 to make contact with the spring 142. In this way impulses are transmitted from ground G⁴ through springs 141 and 142 of the line relay, springs 144 and 146 of the relay 92, through the private magnet relay 91 and the vertical magnet 93, wiper 99 to the battery lead 124, thence through battery B to ground G. As with relay 137, the releasing relay 92 does not have time to deënergize while the line relay 90 is operating. The first impulse transmitted by the line relay 90 causes the private magnet relay 91 to energize, and said relay remains so during the succeeding impulses, owing to its slow-acting character. Upon being energized the said slow-acting relay 91 causes the springs 149 and 150 to make contact, which closes a circuit through the private magnet 95. The impulses produced by the line relay 90, of course, also energize the vertical magnet 93, which acts to raise the shaft one step for each impulse. Since two impulses are transmitted to the shaft, the line and private wipers 87, 88 and 89 are raised two steps and brought opposite the first contact of the second bank level of the selector F. When the impulse wheel 21 ceases to operate the spring 48, the line relay 90 again resumes its constant energized state, so that the private magnet relay 91 deënergizes, allowing the springs 149 and 150 to separate. The private magnet 95 thus being deënergized allows the side switch to trip to second position. As soon as the side switch trips to second position the side switch wiper 99 closes an energizing circuit through the rotary magnet 94 which, by attracting its armature, rotates the shaft one step and places the line wipers in contact with the first trunk-line in the second level. The rotary arm also acting upon the private magnet armature causes it to release the side switch to the third position, providing the first trunk is idle. When the side switch passes to the third position, ground is thrown upon the private wiper 89 from ground G⁴ through the springs 141 and 143 in contact, the side switch wiper 100 thus providing a guarding potential for that trunk-line. In case a trunk-line is busy, however, the shaft wipers will be carried to a trunk-line which is not occupied, in a manner well known. The shaft wipers having been rotated to a trunk-line leading to a connector H, as here assumed, as soon as the side switch passes to the third position, the connector line relay 104 is immediately energized. This circuit extends from ground G⁵ through the winding 151 of the relay 104, over the line conductor 152 through selector F, then over a circuit previously traced through substation A over the other side of the line to selector F again, through it to the trunk conductor 153, through the upper winding of the relay 104 to battery lead 124, thence through battery B to ground G. The line relay acts to throw the spring 154 out of contact with spring 155 and into contact with spring 156, closing an energizing circuit through the release relay 105. As soon as this slow-acting relay energizes, the spring 157 is carried out of contact with the spring 158 and into contact with the spring 159, and the spring 160 engages the spring 161. As soon as springs 160 and 161 close in contact a guarding potential is applied to the trunk-release conductor 162. This guarding potential maintains the slow-acting relay 92 of the selector F energized. The closure of contcat between the release relay springs 157 and 159 connects the line relay spring 155 with the vertical and rotary magnets 108 and 109, respectively. When the subscriber now proceeds to pull his dial for the second digit 2, the line relay 104 operates exactly as the line relay of the selector F operated, thus permitting the spring 154 to make contact with the spring 155 once for each unit of the second digit. In this manner ground impulses are imparted to the vertical magnet 108 as many times as the springs 154 and 155 are closed. In this circuit through the vertical magnet is included the private magnet relay 106. At the first impulse the private magnet relay 106 energizes, and being a slow-acting relay remains energized during the interval that the remaining impulses are imparted to the vertical magnet. At the end of this operation the shaft wipers 101, 102 and 103 will have been brought opposite the first contact of the second level of the connector banks. Upon energizing, the slow-acting private magnet relay 106 separates the springs 163 and 164, and 165 and 166, carrying the spring 164 into contact with the spring 165. This closes an energizing circuit through the private magnet 112. When the line relay 104 ceases to operate, the slow-acting relay 106 deënergizes, resulting in the deënergization of the private magnet 112. Upon doing so the side switch (as is well known) passes to second position. The subscriber is then ready to operate his calling device for the last digit 0. He does so and thereby transmits ten impulses to the line relay 104, which in turn transmits an equal number of impulses to the rotary magnet through the side switch wiper 167 and contact point 168. This results in carrying the shaft wipers into engagement with the required line #220 in the usual manner. The private magnet relay 106 and the private magnet 112 energize, as in the previous instance, while the impulses are being transmitted. If the called line is busy the connector side switch will be locked in second position and the calling subscriber is given a busy-signal. When not busy, at the cessation of the impulses the private magnet deënergizes and permits the side switch to pass to third position. When the side switch wiper 169 passes to contact 170 a guarding potential is provided at the private wiper 103 for protecting the seized line from outside interference. This potential also provides the means for energizing the cut-off relay 171 of the line switch C', thus preventing the switch C' from operating when the subscriber at station A' removes his receiver from the hook in response to a call. When the side switch passes to third position the trunk-release conductor 162 is provided with a guarding potential from ground G⁸,—a guarding potential being provided for this trunk from ground G⁹ for the first and second positions. The calling subscriber's line has now been extended to the normals of the called subscriber, and from these over the line conductors to station A'. As soon as connection is thus established the ringer relay 111 is energized by a current flowing from ground G¹⁰ through the interrupter 172, through the back-bridge relay springs 173 and 174, ringer relay 111, conductor 175, side switch wiper 167, slow-acting relay 106 to the battery lead 124, thence through battery B to ground G. This relay 111, thus energized, throws generator current on the called line to operate the ringer of station A'. When the called subscriber answers, the back-bridge relay 113 is energized by a flow of current from ground G¹¹ through the lower winding of the relay 113 over the positive side of the line conductors, through station A' back over the negative side of the line, through the upper winding of the relay 113, thence through battery B to ground G. The relay 113 energizing separates the springs 173 and 174 and breaks the circuit established from the interrupter 172 through the ringer relay 111. The subscribers are then connected for talking over the main line conductors indicated by the heavy lines. The calling subscriber, upon removing the receiver from the hook and causing the line switch bank contacts to close by the action of the line switch plunger on the same, closes a circuit from battery B through the release magnet 81, line switch bank contacts 128 and 127 to the master switch bank contact 178 upon which, just previous to removing the receiver 72 from the hook 78, rested the wiper arm 179 of the master switch D. Said wiper connects the contact 178 with the bank contact 180 which is permanently connected to ground through the winding 181 of the differential relay 182. The differential relay is constantly energized, but is inoperative until one of its windings is shunted. The circuit just traced shunts the winding 183 of this relay, removing the opposition of the winding to the energization of the winding 181, whereupon the relay operates to close the springs 184 and 185. A circuit is thereby closed through the master switch magnet which, thus energized, operates to carry the wiper 179 to the next adjacent contact of the master switch bank, and to rotate the shaft so that the plungers connected therewith stand directed to the next unoccupied trunk-line. In this way another subscriber belonging to this same group will obtain the next trunk or a trunk that is not engaged. Should the trunk in any case be occupied, however, the wiper arm and plungers will be carried in a similar manner until a free trunk-line is obtained. After the subscribers are through talking, if the calling subscriber hangs up his receiver he opens up the line circuit at the springs 29 and 31, thereby initiating the release of all the switches. At the instant the circuit is broken between the said springs 29 and 31 the double-wound trunk relay 137 deënergizes, permitting the springs 147 and 148 to come into contact. This establishes an energizing circuit for the relay 187 over a path extending from ground G¹² through the relay 187, springs 148 and 147, bank springs 127 and 128, through the release magnet 81 of the line switch C, thence through battery B to ground G. As soon as the relay 187 causes the springs 188 and 189 to close, a release circuit is established through the release magnet 81 from ground G² through the interrupter 190, said release magnet 81, through battery B and to ground G. The release magnet energizes and attracts its armature which, on being released, withdraws the plunger from the line switch bank. The release occurs when the release magnet 81 is deënergized as the interrupter momentarily breaks the circuit. As soon as the plunger is withdrawn the circuit through the said magnet 81 is broken at the bank springs 127 and 128. At the same time the line relay 104 and release relay 105 of the connector H deënergize. As these deënergize an energizing circuit is closed through the release magnet 110 from ground G³, springs 154, 155, 157 and 158, said release magnet 110, normal springs 191 and 192, conductor 124, thence to battery B and ground G. The release magnet thus energized releases the switch shaft and side switch, thereby breaking the energizing circuit through the back-bridge relay 113, if the called subscriber has not done so first by restoring his receiver, and also the energizing circuit through the bridge-cut-off relay 171. In dropping to normal the connector switch shaft breaks the circuit through the release magnet at the normal springs 191 and 192, allowing the release armature to be restored. The operation of the line relay 104 and of the slow-acting relay 105 also causes the release of the preceding switches, since ground from G⁸ is interrupted by both these relays. When this occurs the releasing relay 92 deënergizes, and a circuit is thereby closed through the release magnet 96. The release magnet energizing restores the first-selector side switch and switch shaft, the latter in dropping to normal breaking the circuit through said release magnet at the normal springs. After the switches are thus restored the calling subscriber can then proceed to make another call. In case a line that is called is busy the private magnet 112 remains energized when the last rotary impulse connects the private wiper with a busy line, thus locking the side switch in second position. At the same time the back-bridge relay 113 energizes in series with the private magnet 112. Said relay in energizing closes a circuit through the locking relay 107. When the relay 107 energizes, the circuit of the rotary magnet is broken. In this manner the subscriber is prevented from rotating the connector switch shaft should he attempt to operate his dial while receiving the busy-signal. It will be seen that when the relay 107 energizes, the circuit for maintaining the private magnet 112 energized is then shifted from the private wiper 103 to ground G¹³. The object of this arrangement is to prevent the side switch from unlocking and passing to third position, if the switch that is maintaining the called line busy should be released while the calling subscriber A is receiving the busy-signal. The relay 107, upon energizing, likewise establishes the busy circuit as follows: from the secondary winding of the busy coil 195 to the positive side of the line, through substation A to the negative side of the line, through the interrupter 196, winding of the busy coil 195, back to the secondary winding. When the calling subscriber receives the busy-signal he understands that the line is busy and hangs up his receiver. The line circuit is open, as already explained, with the result that the line and slow-acting relays 104 and 105 of the connector H deenergize, causing the release of the connector and all other switches, as heretofore explained.

From the foregoing it will be seen that I provide a two-wire automatic telephone exchange system in which the release is effected through the medium of slow-acting release relays, and in which the calling subscriber is precluded from stopping or interrupting the calling operation in a manner which would hold the line circuit open for an unduly long period of time—that is to say, for such a period of time as would result in a premature deënergizing of said relays and consequent release of the connection. The dial, owing to the provision of the dial-locking device, is of a non-forcible character—that is to say, it cannot be moved in such manner as to force or accelerate the transmission of the impulses, as it is locked against backward rotation, at least at any time that the calling subscriber should attempt to force it in a backward direction. A very slight backward motion of the said dial, however, is sufficient to automatically release the make-and-break device, which comprises the herein disclosed impulse wheel 21, and after the said make-and-break device has once started to return to normal position, it cannot be stopped or restrained in its motion, but will continue in its operation until it has reached its normal position. When the dial is rotated to the point where its rotation is limited by the stop which engages the finger of the operator, then the slightest movement of the operator's finger in a direction to rotate the dial in a backward direction is sufficient to release the said make-and-break device—that is to say, the impulse wheel 21—and then the return of the said impulse wheel to its normal position will continue uninterruptedly, as when once started in its return to normal position it cannot be stopped by the subscriber. In this way, as explained, the slow-acting relays of the two-wire telephone exchange system to which my invention relates are not subject to premature deënergizing, and premature releases are not liable to happen, as an opening of the line circuit for the period of time required to deënergize said relays and thereby effect the release is not liable to happen until the subscriber hangs up his telephone receiver.

It will be seen that by my invention the impulse-transmitting mechanism is absolutely prevented from being retailed in an off normal position after it has once started to return to normal position. Furthermore, and because there is always a tendency toward a rebound or slight backward movement when the finger strikes the stop, my invention tends to preclude undue retention of the calling mechanism in any position to which it may be advanced by forward rotation of the dial. The tendency, therefore, is always to release the impulse-transmitting mechanism as soon as the finger strikes the stop.

What I claim as my invention is:—

1. In a telephone system, a substation calling mechanism comprising a make-and-break device, a dial for determining the degree of operation of said device, spring means for propelling said device, and means operative by slight backward movement of said dial for releasing said device to permit the same to return to normal while the dial remains at rest in its advanced position, there being means for operating the make-and-break device by the forward rotation of the dial.

2. In a telephone system, a substation calling mechanism comprising a make-and-break device, a dial for determining the degree of operation of said device, spring means for operating said device, and automatic means for releasing said device to permit the same to return to normal position while the dial remains at rest in its advanced position, there being means for operating the make-and-break device by the forward rotation of the dial.

3. In a telephone system, a substation calling mechanism comprising a make-and-break device, a dial for determining the degree of operation of said device, spring means for operating said device, means for locking said dial against forcible backward rotation, and means for releasing the device from said dial to permit the former to return to normal while the latter remains at rest in its advanced position, there being means for operating the make-and-break device by the forward rotation of the dial.

4. In a telephone system, a substation calling mechanism comprising a make-and-break device, a dial for determining the degree of operation of said device, spring means for operating said device, suitable connections by which the forward rotation of the dial correspondingly advances the said device, means for releasing said device to permit the same to return to normal, and means for holding the said dial against backward rotation while the said device is thus returning to normal.

5. In a telephone system, a calling mechanism comprising a make-and-break device, a dial for determining the degree of operation of said device, spring means for operating said device, and means tending to preclude undue retention of said device in any position to which it has been advanced by said dial, operative to release said device upon slight backward movement of the dial, for the purpose specified, there being means for operating the make-and-break device by the forward rotation of the dial.

6. In a telephone system, a closed line circuit, calling mechanism comprising a break and make device for opening and closing said line circuit at a normal rate of speed, and means for preventing retention of said device in a condition to hold said circuit open for a period of time longer than the normal period.

7. In a subscriber's calling mechanism, a closed circuit, a rotary dial. means for operating the same, a spring-propelled break and make device operated thereby for opening and closing said circuit at a normal rate of speed, and means for preventing interference with the operation of said break and make device to cause it to operate at a different rate of speed.

8. In a telephone system having a subscriber's calling mechanism, the combination of a rotary dial, means for operating the same, a spring-propelled break and make device controlled thereby, means for locking the dial for preventing interference with the operation of said break and make device to cause it to operate at a different rate of speed, and a subscriber's metallic line circuit controlled by said device.

9. In a subscriber's calling mechanism, a make-and-break device, a dial for determining the degree of operation of said device, means whereby said dial can never rotate backward to normal position, mechanical connections between said dial and device whereby the forward rotation of the former correspondingly advances the latter, and means for releasing the said device to permit the same to return to normal.

10. In a subscriber's calling mechanism, means for transmitting impulses, a rotatable dial for controlling said impulse transmitting means having an endless series of holes adapted to rotate in but one direction, a stationary series of numerals for said holes, and a stop for variably limiting the rotation of said dial according to the hole selected.

11. In a subscriber's calling mechanism, a dial rotatable only in one direction and provided with an endless series of holes, a make-and-break device automatically releasable from said dial, and a series of stationary numerals for said holes, there being means for operating the make-and-break device by the forward rotation of the dial.

12. In a subscriber's calling mechanism, means for transmitting impulses, a stationary series of numerals for determining the degree of operation of said mechanism in calling, a member for controlling said impulse transmitting means rotatable only in one direction relatively to said numerals, and a stop for variably limiting the rotation of said member.

13. In a telephone system, a substation calling mechanism comprising a make-and-break device, a common battery transmitter connected in series with said make-and-break device and receiving current for talking purposes through the same, a dial for determining the degree of operation of said device, a stop for variably limiting the rotation of said dial, spring means for propelling said device, and means operative by slight backward movement of said dial for releasing said device to permit the same to return to normal while the dial remains at rest in its advanced position, there being means for operating the make-and-break device by the forward rotation of the dial.

14. In a telephone system, a substation calling mechanism comprising a make-and-break device, a common battery transmitter connected in series with said make-and-break device and receiving current for talking purposes through the same, a dial for determining the degree of operation of said device, a stop for variably limiting the rotation of said dial, spring means for operating said device, and automatic means for releasing said device to permit the same to return to normal position while the dial remains at rest in its advanced position, there being means for operating the make-and-break device by the forward rotation of the dial.

15. In a telephone system, a substation calling mechanism comprising a make-and-break device, a common battery transmitter connected in series with said make-and-break device and receiving current for talking purposes through the same, a dial for determining the degree of operation of said device, a stop for variably limiting the rotation of said dial, spring means for operating said device, means for locking said dial against forcible backward rotation, and means for releasing the device from said dial to permit the former to return to normal while the latter remains at rest in its advanced position, there being means for operating the make-and-break device by the forward rotation of the dial.

16. In a telephone system, a substation calling mechanism comprising a make-and-break device, a common battery transmitter connected in series with said make-and-break device and receiving current for talking purposes through the same, a dial for determining the degree of operation of said device, a stop for variably limiting the rotation of said dial, spring means for operating said device, suitable connections by which the forward rotation of the dial correspondingly advances the said device, means for releasing said device to permit the same to return to normal, and means for holding the said dial against backward rotation while the said device is thus returning to normal, there being means for operating the make-and-break device by the forward rotation of the dial.

17. In a telephone system, a calling mechanism comprising a make-and-break device, a transmitter connected in series with said make-and-break device and receiving current for talking purposes through the same, a dial for determining the degree of operation of said device, a stop for variably limiting the rotation of said dial, spring means for operating said device, and means tending to preclude undue retention of said device in any position to which it has been advanced by said dial, operative to release said device upon slight backward movement of the dial, for the purpose specified, there being means for operating the make-and-break device by the forward rotation of the dial.

18. In a telephone system, and in combination with means for connecting subscribers and whereby the release is effected by the opening of the subscriber's metallic line circuit, when the receiver is hung up, a calling mechanism comprising a make-and-break device, a common battery transmitter connected in series with said make-and-break device and receiving current for talking purposes through the same, and means for preventing retention of said device in a condition to hold the circuit open for an undue period of time to prevent a premature release.

19. In a subscriber's calling mechanism, the combination of a rotary dial, a stop for variably limiting the rotation of said dial, a spring-propelled make-and-break device associated therewith, means for preventing interference with the operation of said make-and-break device, and a common battery transmitter connected in series with said make-and-break device and receiving current for talking purposes through the same.

20. In a telephone system having a subscriber's calling mechanism, the combination of a rotary dial, a stop for variably limiting the rotation of said dial, a spring-propelled make-and-break device, means for preventing interference with the operation of said make-and-break device, a common battery transmitter connected in series with said make-and-break device and receiving current for talking purposes through the same, and a subscriber's metallic line circuit controlled by said device.

21. In a subscriber's calling mechanism, a make-and-break device, a common battery transmitter connected in series with said make-and-break device and receiving current for talking purposes through the same, a dial for determining the degree of operation of said device, a stop for variably limiting the rotation of said dial, means whereby said dial can never rotate backward to normal position, mechanical connections between said dial and device whereby the forward rotation of the former correspondingly advances the latter, and means for releasing the said device to permit the same to return to normal.

22. In a subscriber's calling mechanism, means for transmitting impulses, a dial rotatable only in one direction, for controlling said impulse transmitting means having an endless series of finger holes, a finger stop for variably limiting the rotation of said dial, and a stationary series of numerals for said holes.

23. In a subscriber's calling mechanism, a dial rotatable only in one direction and provided with an endless series of holes, a stop for variably limiting the rotation of said dial, a make-and-break device automatically releasable from said dial, a common battery transmitter connected in series with said make-and-break device and receiving current for talking purposes through the same, and a series of stationary numerals for said holes, there being means for operating the make-and-break device by the forward rotation of the dial.

24. A telephone exchange system impulse transmitter comprising a dial, an impulse wheel, means for returning the wheel to normal position, means for holding the dial locked in its advanced position, and means for releasing the dial when the wheel reaches its normal position.

25. In a telephone system, a subscriber's calling dial, an impulse wheel, means for returning the wheel to normal position, means for holding the dial locked in its advanced position, means for releasing the dial when the wheel reaches its normal position, and means for normally locking the dial against rotation.

26. In a two-wire telephone exchange system, a calling dial therefor, an impulse wheel, means for returning the wheel to normal position, means for holding the dial locked in its advanced position, means for releasing the dial when the wheel reaches its normal position, and normally closed line springs adapted to be opened and closed to transmit the impulses.

Signed by me at Chicago, Cook county, Illinois, this 15th day of February, 1908.

BETHUEL M. DAVIS.

Witnesses:
EDWARD D. FALER,
JENNIE NORBY.

Copies of this patent may be obtained for five cents each, by addressing the "Commissioner of Patents, Washington, D. C."

It is hereby certified that in Letters Patent No. 1,146,786, granted July 20, 1915, upon the application of Bethuel M. Davis, of Chicago, Illinois, for an improvement in "Telephone Systems," errors appear in the printed specification requiring correction as follows: Page 6, strike out the sentence commencing with the word "When," line 48, and ending with the compound word "trunk-line," line 54; same page, line 84, for the word "contcat" read *contact*; page 8, line 106, for the word "retailed" read *retained*; and that the said Letters Patent should be read with these corrections therein that the same may conform to the record of the case in the Patent Office.

Signed and sealed this 7th day of September, A. D., 1915.

[SEAL.]

J. T. NEWTON,
*Acting Commissioner of Patents.*